(12) United States Patent
Wosik (10) Patent No.: US 10,708,175 B2
(45) Date of Patent: Jul. 7, 2020

(54) NETWORK ADDRESS TRANSLATION IN NETWORKS USING MULTIPLE NAT DEVICES

(71) Applicant: T-Mobile USA, Inc., Bellevue, WA (US)

(72) Inventor: Grzegorz Wosik, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/169,977

(22) Filed: Oct. 24, 2018

(65) Prior Publication Data

US 2019/0068487 A1    Feb. 28, 2019

Related U.S. Application Data

(63) Continuation of application No. 15/259,013, filed on Sep. 7, 2016, now Pat. No. 10,142,221.

(51) Int. Cl.
| | |
|---|---|
| *H04W 56/00* | (2009.01) |
| *H04L 12/703* | (2013.01) |
| *H04L 12/24* | (2006.01) |
| *H04L 12/26* | (2006.01) |
| *H04L 29/12* | (2006.01) |
| *H04L 12/725* | (2013.01) |
| *H04L 12/803* | (2013.01) |

(52) U.S. Cl.
CPC .......... *H04L 45/28* (2013.01); *H04L 41/0668* (2013.01); *H04L 43/0817* (2013.01); *H04L 61/256* (2013.01); *H04L 61/2514* (2013.01); *H04L 61/2532* (2013.01); *H04L 45/302* (2013.01); *H04L 47/125* (2013.01)

(58) Field of Classification Search
CPC . H04L 45/28; H04L 41/0668; H04L 43/0817; H04L 61/2514; H04L 61/2532; H04L 61/256
USPC ........................................................ 370/221
See application file for complete search history.

(56) References Cited

U.S. PATENT DOCUMENTS

| | | | | |
|---|---|---|---|---|
| 8,451,711 B1* | 5/2013 | O'Toole, Jr. | ........ | H04L 67/2814 370/216 |
| 8,649,418 B1* | 2/2014 | Negus | .................. | H04B 7/0486 375/211 |
| 8,706,864 B1* | 4/2014 | Brandwine | ......... | H04L 41/5019 709/224 |
| 10,142,221 B2 | 11/2018 | Wosik | | |
| 2002/0080754 A1* | 6/2002 | Travostino | .............. | H04L 29/06 370/338 |

(Continued)

*Primary Examiner* — Sai Ming Chan
(74) *Attorney, Agent, or Firm* — Perkins Coie LLP (57) ABSTRACT

Systems, methods, and network topology for network address translation (NAT) are disclosed. In some embodiments, a cluster of NAT devices shares at least one backup NAT device configured to back up all or some of the NAT devices in the cluster. Each NAT device, including the backup NAT device, advertises its status at a regular interval to a router. If the router determines that an active NAT device is no longer advertising its status, the router can send data to the backup NAT. In some embodiments, the router routes traffic to active and backup devices based on networking protocols such as Border Gateway Protocol (BGP) and/or Open Shortest Path First (OSPF). The router can also route data to NAT devices using a round-robin algorithm.

18 Claims, 8 Drawing Sheets

(56) References Cited

U.S. PATENT DOCUMENTS

2003/0058839 A1\* 3/2003 D'Souza ........... H04L 29/06027
370/352
2010/0322247 A1\* 12/2010 Ichihashi .......... H04L 29/12367
370/392
2012/0005299 A1\* 1/2012 Xu .................... H04L 29/12358
709/208
2018/0069782 A1 3/2018 Wosik \* cited by examiner

NETWORK ADDRESS TRANSLATION IN NETWORKS USING MULTIPLE NAT DEVICES

CROSS-REFERENCE TO RELATED APPLICATION

This application is a continuation of U.S. patent application Ser. No. 15/259,013, filed Sep. 7, 2016, entitled "NETWORK ADDRESS TRANSLATION IN NETWORKS USING MULTIPLE NAT DEVICES"; which is incorporated by reference in its entirety.

BACKGROUND

Internet Protocol version 4 (IPv4) uses 32-bit addresses. As a result, the address space for IPv4 is limited to approximately 4.3 billion IP addresses. These 4.3 billion IP addresses are generally available to the public (also referred to as public IP addresses). However, with the proliferation of computing devices throughout the world, the number of available public IP addresses through IPv4 is insufficient. For example, there are currently 7.125 billion people in the world, and a significant portion of these people have multiple computing devices (e.g., personal and work laptops, personal and work desktops, mobile devices, tablets), all of which need to use public IP addresses to send and receive data over the Internet.

One technical solution for addressing the insufficient number of public IP addresses is a network address translation (NAT) device. A NAT device maps multiple private IP addresses (also referred to as "local IP addresses") to one or more public IP addresses. More specifically, NAT is a method of translating one IP address space into another by modifying network address information in IP packet headers while they are in transit across a traffic routing device. As a result, a single public IP address can represent multiple private IP addresses such as for all computing devices within an organization, company, or on a private network.

However, NAT devices have shortcomings. NAT devices are expensive. A single NAT device can cost $200,000 USD or more, so a NAT device and a backup NAT device together would cost $400,000 USD or more. Furthermore, NAT devices can fail and cause a communication breakdown. The need exists for systems and methods that overcome the above problems, as well as provide additional benefits. Other limitations of existing or prior systems will become apparent to those with ordinary skill in the art upon reading the following Detailed Description.

DETAILED DESCRIPTION

The disclosed technology generally relates to network address translation (NAT) devices, methods of using NAT devices, and associated network topology. Historically, each NAT device has a dedicated backup NAT device, and the NAT device communicates with its dedicated backup NAT device in a master-slave relationship. The dedicated backup NAT device (slave) handles address translation when the master NAT device fails or malfunctions. This setup (i.e., having a dedicated backup NAT device for each master NAT device) has several shortcomings, including the following: (1) NAT devices are expensive, (2) each NAT device vendor has different specifications for their NAT and backup NAT devices (e.g., proprietary operating/communication protocols and software), and (3) the master-slave relationship may not be flexible (e.g., the master and slave only work together and cannot work with other NAT devices).

In contrast, in a network arrangement according to the disclosed technology, a cluster of two or more NAT devices shares a single backup NAT device configured to back up all or some of the NAT devices in the cluster. A backup NAT device may also be referred to as a reserve NAT device, or standby NAT device. Each NAT device in the cluster and the backup NAT advertise its status at a regular interval to a router. If the router determines that a NAT device in the cluster is no longer advertising its status after a predetermined time period, the router can send data packets to the backup NAT device for IP address translation. The router can continue to route data packets through the backup NAT device until the failed NAT device advertises its status again. Alternatively or additionally, and as described in more detail in FIGS. 2-7, a network arrangement can have multiple backup NAT devices.

To advertise status, the router, NAT devices, and backup NAT devices can implement one or more networking protocols, such as: Border Gateway Protocol (BGP), Open Shortest Path First (OSPF) protocol, Bidirectional Forwarding Detection (BFD) protocol, a combination of these protocols, or a customized protocol (e.g., a modified version of BFD). In implementing these networking protocols, the router, NAT devices, and backup NAT device can send and receive advertising packets. Advertising packets are a formatted unit of data that indicate the status (e.g., availability) of a device, such as: on, active, off, not active, or malfunction status.

Also, in some embodiments, the advertising packet may not have status information, but instead be a simple "heartbeat" signal. A heartbeat signal means receiving an advertising packet from a device indicates the device is active (e.g., working) and failing to receive an advertising packet from the device indicates the device is inactive (e.g., not powered on), has failed, or communication with that device has failed. For example, a NAT device can send advertising packets at regular intervals (e.g., every 300 ms). As such, if a router does not receive an advertising packet for a predetermined time period, e.g., 900 ms (equivalent to 3 missed packets), the router can automatically update its routing table to reflect that that NAT device has failed, and network traffic should be routed to another available NAT. The amount of time (also referred to as "predetermined" or "desired" failover time) can vary depending on network goals such as availability of processing power to send and receive advertising packets or frequency of advertising necessary to provide a stable network connection and type of network (e.g., telecommunications or computer network).

Alternative, or in addition, to having a single backup NAT device that backs up multiple NAT devices, the disclosed technology can also implement a round-robin algorithm to route packets for translation to NAT devices. Using the round-robin algorithm, the disclosed technology avoids a backup NAT device, and instead routes packets to a first available NAT device. If the first available NAT device becomes unavailable (e.g., due to link failure or device failure), the disclosed technology can route traffic to the next available NAT device (also referred to as "an alternate NAT device"). To determine the available NAT devices in a network, the disclosed technology can maintain a list of the status (e.g., available or not available) of all NAT devices in a network using network working algorithms such as BGP, OSPF, BFD, or any combination thereof.

Also, the disclosed technology integrates load balancing into NAT duties. Load balancing refers to distributing NAT duties across multiple NAT devices to reduce (e.g., optimize) the translation load on individual NAT devices. By distributing the load, individual NAT devices are less likely to be overloaded. In some embodiments, routers and NAT devices can use the Simple Network Management Protocol (SNMP) to track the utilization of NAT devices. Utilization information is generally a measure of a device output level compared to device capacity. Based on this tracked utilization, a locally running application on a router or NAT device can adjust a load of NAT across a cluster of NAT devices.

In some embodiments, an external system receives utilization information from NAT devices and routers that implement the SNMP. The external system can use the utilization information to balance network address translation loads across routers and NAT devices or report the utilization information to a system administrator. Also, the external system can automate the process of load balancing by sending instructions to routers and/or NAT devices periodically to distribute NAT duties based on utilization information. Based the nature of network requirements, business requirements, and computer computation availability, the external system can rebalance the NAT loads at different frequencies (e.g., every 10 minutes, every day, weekly).

The disclosed technology has one or more benefits. One benefit is a flexible backup policy, whereby one NAT device can back up multiple NAT devices. This flexibility allows network administrators to reduce costs by buying fewer backup NAT devices compared to the traditional one-to-one relationship between a NAT and its backup NAT. Further, the disclosed technology can operate without a dedicated backup device and route traffic to the first available NAT device by executing a round-robin or other algorithm. Also, the disclosed technology is generally independent of NAT device vendor specifications and protocols, which allows network administrators to use NAT devices from various vendors, in contrast to the traditional setup in which the NAT devices had to be compatible with one another (i.e., having the same vendor specifications). For the disclosed technology, as long as a NAT device can execute a networking protocol to advertise its status, the other devices and components in the network do not need to be compatible with the NAT device.

Additionally, the network arrangement in the disclosed technology is scalable. For example, the number of NAT devices and backup NAT devices recommended for a network can vary based on network traffic, network type, capacity of each NAT device, and predicted loads on each NAT device. A backup NAT device is no longer required for every NAT device, in contrast with the traditional one-to-one relationship, and thus, the total number of NAT devices in a system can be reduced. In some embodiments, the disclosed technology has "N" NAT devices and "M" backup NAT devices, where N>1 and N>M; as compared to the traditional one-to-one relationship where N=M. As an example, if a network provider used four NAT devices with the traditional setup, four backup NAT devices would be required. In contrast, with the disclosed technology, four NAT devices can be used with one backup NAT device—three fewer NAT devices than before—which also leads to a significant cost savings.

Furthermore, the disclosed technology has one or more benefits associated with Internet Protocol version 6 (IPv6). The Internet Engineering Task Force (IETF) designed IPv6 to replace IPv4. IPv6 uses a 128-bit address, which theoretically allows approximately $3.4 \times 10^{38}$ public IP addresses, more than $7.9 \times 10^{28}$ times as many public IP addresses as are available in IPv4. Also, exhaustion of IPv4 public addresses is encouraging Internet Service Providers (ISPs), especially mobile ISPs, to use IPv6 addressing. As a result, many IPv6 only devices need to communicate to Internet services that are still IPv4 only. The disclosed technology can implement both NAT44, which translates an IPv4 address to another IPv4 address, and NAT64, which facilitates IPv6 to IPv4 communication. More generally, a network administrator can design each NAT device to perform NAT44 and/or NAT64 to meet translation and capacity requirements for a network.

Also, NAT devices provide additional features such as security and firewalls. For example, NAT devices inherently function as hardware firewalls that prevent unsolicited, unexpected, unwanted, and potentially annoying or dangerous traffic from passing through the router and entering a private local area network (LAN). As a result, the disclosed technology addresses security issues as well as IP address limitation issues. Other benefits will become apparent to those having ordinary skill in the art based on this disclosure.

Various implementations of the disclosed technology are described below. The following description provides specific details and an enabling description of these implementations.

Illustrative Environment

Figure 1:
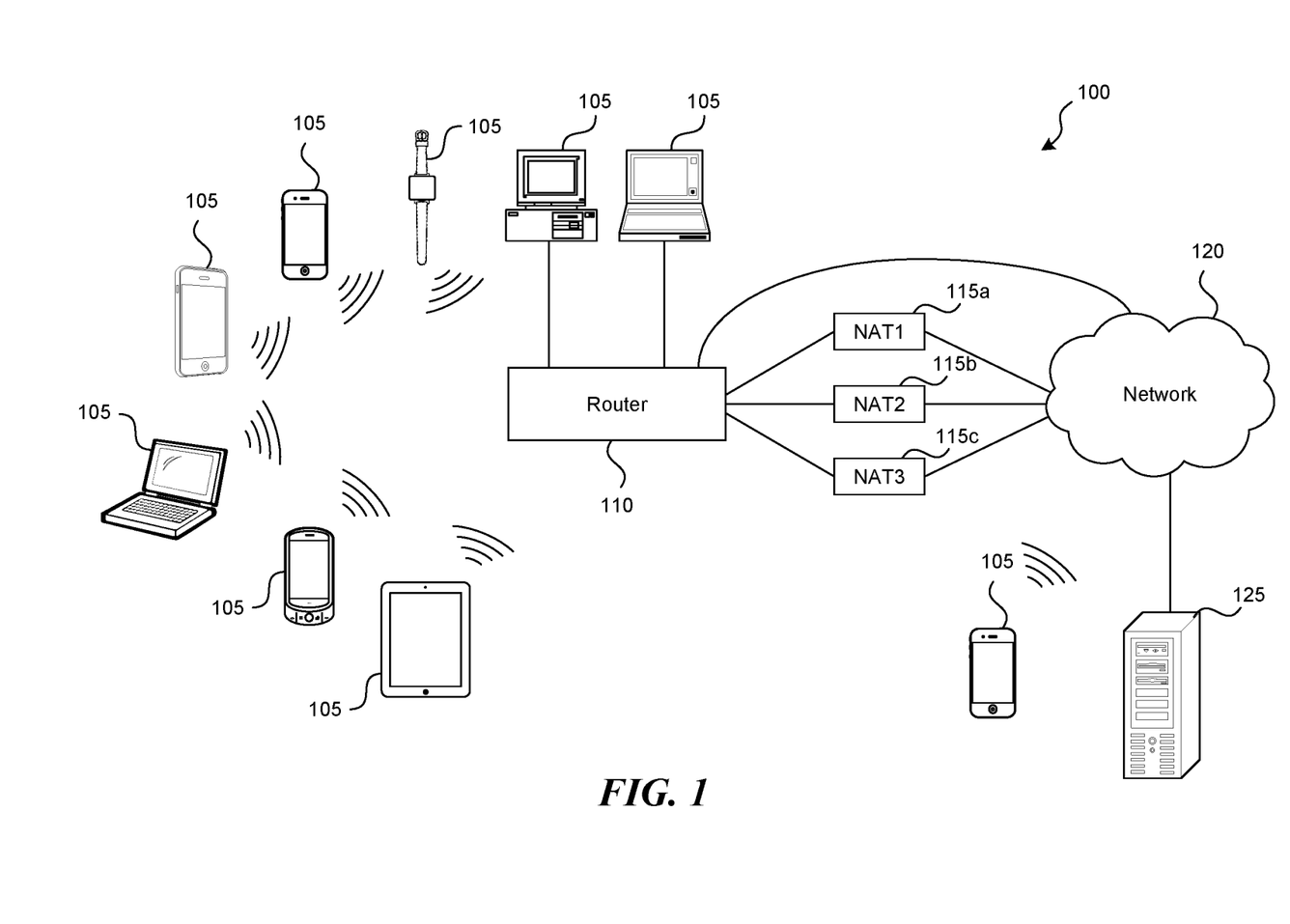
FIG. 1 illustrates a communications environment in accordance with embodiments of the disclosed technology.

FIG. 1 illustrates a communications environment 100 in accordance with the disclosed technology. The communications environment 100 includes one or more computing devices 105. Computing devices 105 can include a mobile phone (e.g., iPhone™), desktop computer, laptop computer, tablet, or a wearable device such as a smart watch, and other electronic devices. Computing devices 105 can access other networks and devices in communications environment 100. Data communications (also referred to as "communications") can be exchanged in communications environment 100 in some form of transmission such as a wireless or wired network. Some sample communications in communications environment 100 include a mobile device sending a request to search content of the World Wide Web (WWW), begin a Voice over Internet Protocol (VoIP) call, or send/receive an email.

Computing devices 105 communicate with a router 110. The router 110 is a networking device that routes (e.g., forwards, switches) data packets to networks, devices (e.g., computing devices 105), and/or other routers. The router is also responsible for addressing communications so they are sent to the correct destination and for finding a path through a network to a destination. The router 110 can be an edge router or a core router. In some embodiments, the router 110 routes traffic (e.g., packets) based on networking protocols such as BGP, OSPF, BFD, and other like networking protocols, or a suite of networking protocols. Additionally, the router 110 can use the BFD protocol to provide router status information (e.g., active, error, standby) to other devices. Although one router is shown in FIG. 1, a communications environment 100 can have several routers 110. More details regarding the router 110 are described in FIGS. 2-7.

As shown in FIG. 1, the communications environment 100 has multiple NAT devices 115a-c (also referred to as a "cluster of NAT devices" or "group of NAT devices"). Each of the NAT devices 115a-c can map private IP addresses to one or more public IP addresses. As an example, an ISP may designate the public IP address 209.200.210.5 to a company or organization. The NAT device then maps all private IP addresses to that public IP address. As described in more details in FIGS. 2-7, NAT devices can be "regular" or "active" NAT devices or they can be backup NAT devices, where backup NAT devices operate in a standby mode and perform NAT for a regular NAT device that fails. Also, backup NAT devices can back up NAT devices in one network or in multiple networks.

As shown in FIG. 1, the NAT devices 115a-c and router 110 can communicate to route network traffic. In some implementations, computing devices 105 are operating on a local network (e.g., private LAN or WLAN) and communicate with the router 110. The router 110 can route communications intended to stay within the local network to a destination device based on header information of a packet (e.g., a private IP address in the header). If a computing device 105 intends to communicate with a device or network outside the LAN, the router 110 forwards the communication to one of the NAT devices 115a-c to translate the private IP address of the device to a public IP address so to that the communication can be sent on the Internet. For example, packets that originate from a private IP address and port are converted by the NAT device to a public IP address and port before being sent to another device or network (e.g., the Internet). The mapping from a private IP address and port to a public IP address and port can be done with a translation table stored the NAT device. In some embodiments, the router receives the address or unique ID of each NAT device when it creates its routing table. Also, although not shown in FIG. 1, a NAT device (or multiple NAT devices) and router can be combined into one device.

The NAT devices 115a-c are connected to a network 120, which can include wireless or wired networks such as, but not limited to, one or more of: a LAN; wireless local area network (WLAN); wide area network (WAN); global system for mobile communications (GSM); Bluetooth; WiFi; Fixed Wireless Data; and 2G, 2.5G, 3G, 4G, 5G, and LTE networks, using messaging protocols such as Transmission Control Protocol (TCP), IP, Short Message Service (SMS), Multimedia Messaging Service (MMS), or any other wireless data networks or messaging protocols. The network 120 can use standard communication technologies and/or protocols. In some embodiments, the network 120 is the Internet.

The network 120 is connected to a server 125, which can be a single server or part of a distributed computing environment encompassing multiple servers. Also, the server can communicate with computing devices 105. The server 125 can be associated with an Internet Service Provider (ISP). The server 125 can also host services such as email, VoIP, and/or an application. Computing devices 105 and router 110 can send and receive communications from the server over the network 120. In some embodiments, the server 125 can host a VoIP call between two computing devices 105.

The communications environment 100 can be a part of a telecommunications network, computer network, or other communication network. For example, a mobile phone can execute a VoIP call or perform an Internet search by accessing an ISP. Although not shown in FIG. 1, the communications environment 100 can also include an Ethernet switch, firewall, and other computing devices or networking devices (e.g., telecommunications equipment and devices). Additionally, devices in the communications environment 100 can be combined. For example, a NAT device may be combined with a router.

The techniques described in detail herein can be embodied as special-purpose hardware (e.g., circuitry), programmable circuitry appropriately programmed with software and/or firmware, or a combination of special-purpose and programmable circuitry. Hence, embodiments can include a machine-readable medium having stored thereon instructions that may be used to program a computer (or other electronic devices) to perform a process. The machine-readable medium can include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable mediums suitable for storing electronic instructions.

Illustrative Network Configuration

Figure 2:
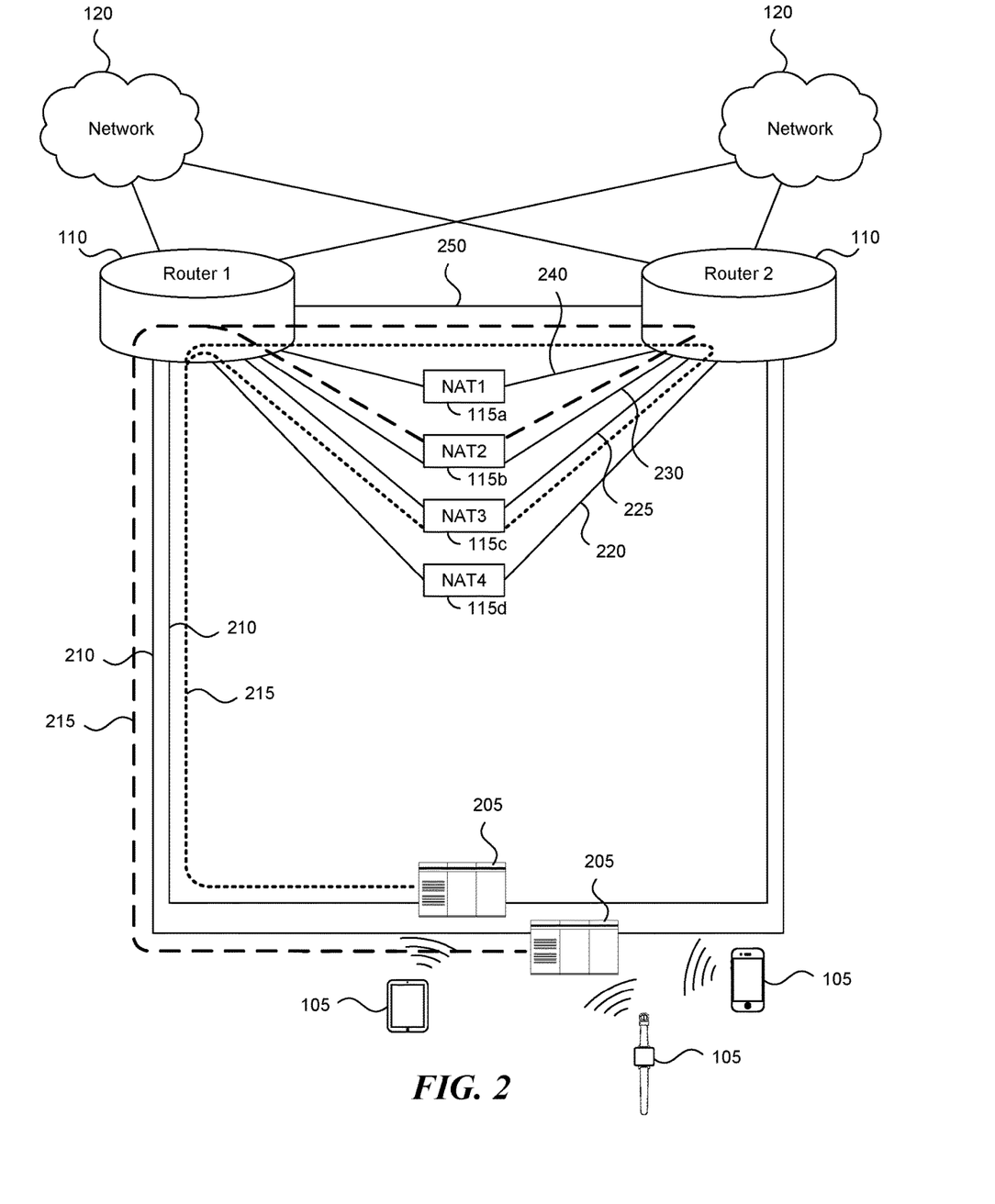
FIG. 2 is a block diagram illustrating various components used to route communications in accordance with embodiments of the disclosed technology.

FIG. 2 is a block diagram illustrating various components used to route communications in accordance with the disclosed technology. As a broad overview, FIG. 2 illustrates the flow of network traffic from a computing device 105 to networks 120. In some embodiments, one or more NAT devices 115a-d serve as a backup NAT device. A backup NAT device handles NAT for one or more failed NAT devices. Generally, backup NAT devices operate in a standby mode, where the backup NAT device advertises its status as "standing by". If a router determines that a previously working NAT device has failed or communication with that NAT device has failed, the router can forward traffic intended for the failed NAT device to the backup NAT device. More details regarding the backup NAT and NAT devices, determining the number of backup NAT devices, and how and when to use backup NAT devices are described in FIGS. 3-7. Further, in some embodiments, all NAT devices 115a-d may be active and there may be no dedicated backup NAT device, which is described in more detail in FIG. 7.

As shown in FIG. 2, gateways 205 can be used to communicate with routers 110, networks 120, and computing devices 105. The gateways 205 can vary, depending on the type of network or type of communications on the network. In a telecommunications network, the gateways 205 can be gateway general packet radio service (GGPRS)

support nodes that communicate (e.g., through wires or wirelessly) with routers 110. The GGPRS core network is a central part of the general packet radio service (GPRS), which enables 2G, 3G and wideband code division multiple access (WCDMA) mobile networks to transmit IP packets to external networks such as the Internet.

Gateways 205 and other devices can communicate using links. Links 210, 220, 225, 230, 240, and 250 illustrated by solid lines in FIG. 2 can be a transmission media (also referred to as the "physical media") used to link devices or components of a network. Some examples include Ethernet cable, optical fiber, or a wireless link.

Traffic paths 215 illustrated by dashed lines in FIG. 2 represent a communication through the gateways 205, routers 110, NAT devices 115a-d, and/or networks 120. For example, a computing device 105 can request access to the Internet. The gateway 205 can receive the request and forward it to router 110 (either Router 1 or Router 2, depending on networking policy and/or availability). Using the link 210, the router 110 sends the communication to a NAT device 115a-d for IP address translation and then to the network 120.

The NAT devices 115a-d can communicate with both routers 110. As described in more detail below, each of the NAT devices 115a-d can communicate its status (e.g., active, inactive, malfunction, error) to the routers 110 using the links 220, 225, 230, 240. The routers 110 can communicate their status using the link 250. Based on communications between the links, the routers 110 can determine which NAT devices 115a-d are working (e.g., advertising status as active and translating) or not working (e.g., failing to send an advertising packet or reporting an error). Using the communications of status, the routers 110 and NAT devices 115a-d can update their respective routing tables to determine where to send traffic.

In one example, one computing device 105 sends an email, which the gateway 205 receives as a request to send an email and forwards it to one of the routers. One of the routers 110 determines that a data packet associated with the request to send the email came from a private IP address and should be translated to a public IP address to be sent to the Internet where the email can be delivered. The router 110 forwards the request to one of the NAT devices 115a-d based on router policy using a link. The receiving NAT device translates the private IP address of the data packet to a public IP address (e.g., by modifying the header of the data packet). After translation, the NAT device sends a translated data packet to the router 110. The router 110 forwards the translated packet now associated with a public IP address to the network 120, where an email service completes the request.

After the request to send the email is complete, the email service sends a notification of the completed request to router 110 using the known public IP address associated with the request to send the email. The router 110 sends the notification to the NAT device that performed the translation. The NAT device translates the public IP address associated with the notification to the known private IP address associated with the computing device that requested to send the email. The NAT device sends the translated notification to the router 110, which forwards the notification to the gateway 205. The gateway 205 sends the notification of the completed request to the computing device 105. In this example, the flow of data did not encounter an error in the translation process. If there was an error, one of the other NAT devices could have handled the request to translate IP address of the data packet. The process of handling an error or malfunction is described in more detail in FIGS. 3-7.

Flow Diagram Illustrating Example Process

Figure 3:
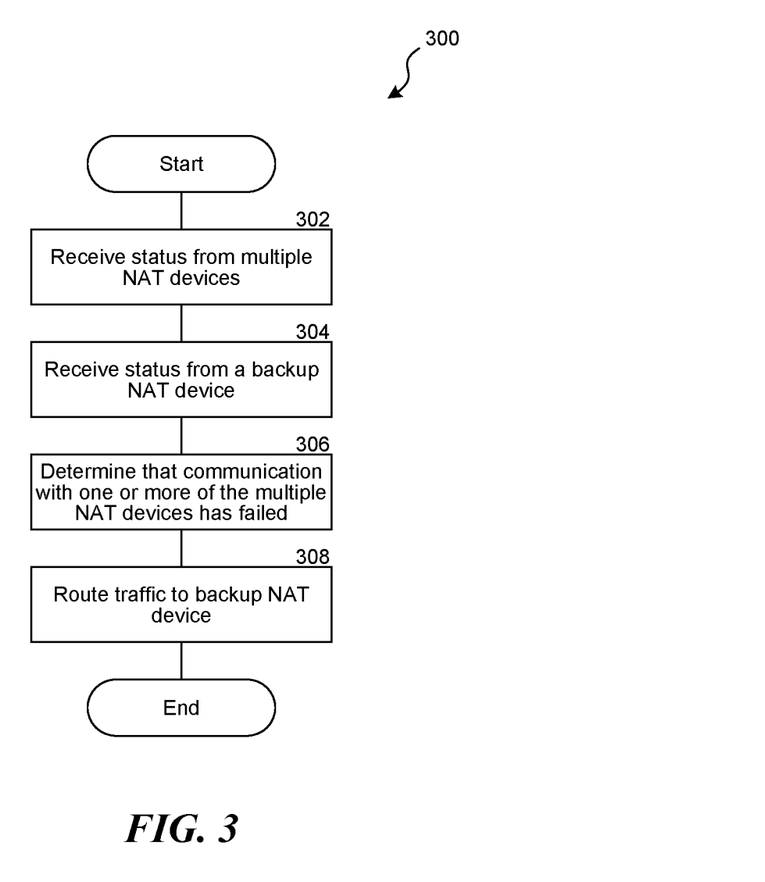
FIG. 3 is a flowchart illustrating a process for routing communications in accordance with embodiments of the disclosed technology.

FIG. 3 is a flowchart illustrating a process 300 for routing communications, which can be implemented by the 110 router. Process 300 begins at receiving operation 302 where the router 110 receives a status from multiple NAT devices. In some embodiments, the router receives advertising packets that include status information for each of the NAT devices. The NAT devices can send advertising packets at regular intervals (e.g., every second, every 100 ms), irregular intervals, or a combination thereof. The frequency of sending advertising packets and the BFD protocol can be modified according to network administrator settings. For example, in a telecommunications network with VoIP as a service, a network administrator may require more frequent advertising (e.g., send advertising packets every 150 ms), as compared to a computer network used for Internet service (e.g., email or web browsing, which are tolerate to delays/latency). With delay-tolerant services, a network administrator can set the advertising frequency to more than 150 ms (e.g., 1 second or less). Additionally, the router can also implement a BFD protocol to make the status communication bidirectional between the router and NAT device (or devices).

During status operation 304, the router 110 receives a status from a backup NAT device. Similar to the sending of advertising packets from a NAT device in receiving operation 302, backup NAT devices can also send advertising packets to routers. In some embodiments, a backup NAT device can advertise its status as "standby." Standby generally means the backup NAT device is available to translate IP addresses but is not actively translating. Table 1 below is an example of status information stored by a router in a routing table or other data structure. The first column contains identifying information for NAT devices in communication with a router; the second column contains status information for the NAT devices based on the receiving an advertising packet.

TABLE 1

| NAT Device | Status |
| --- | --- |
| NAT1 | Active |
| NAT2 | Active |
| NAT3 | Active |
| NAT4 (backup) | Standby |

Figure 4:
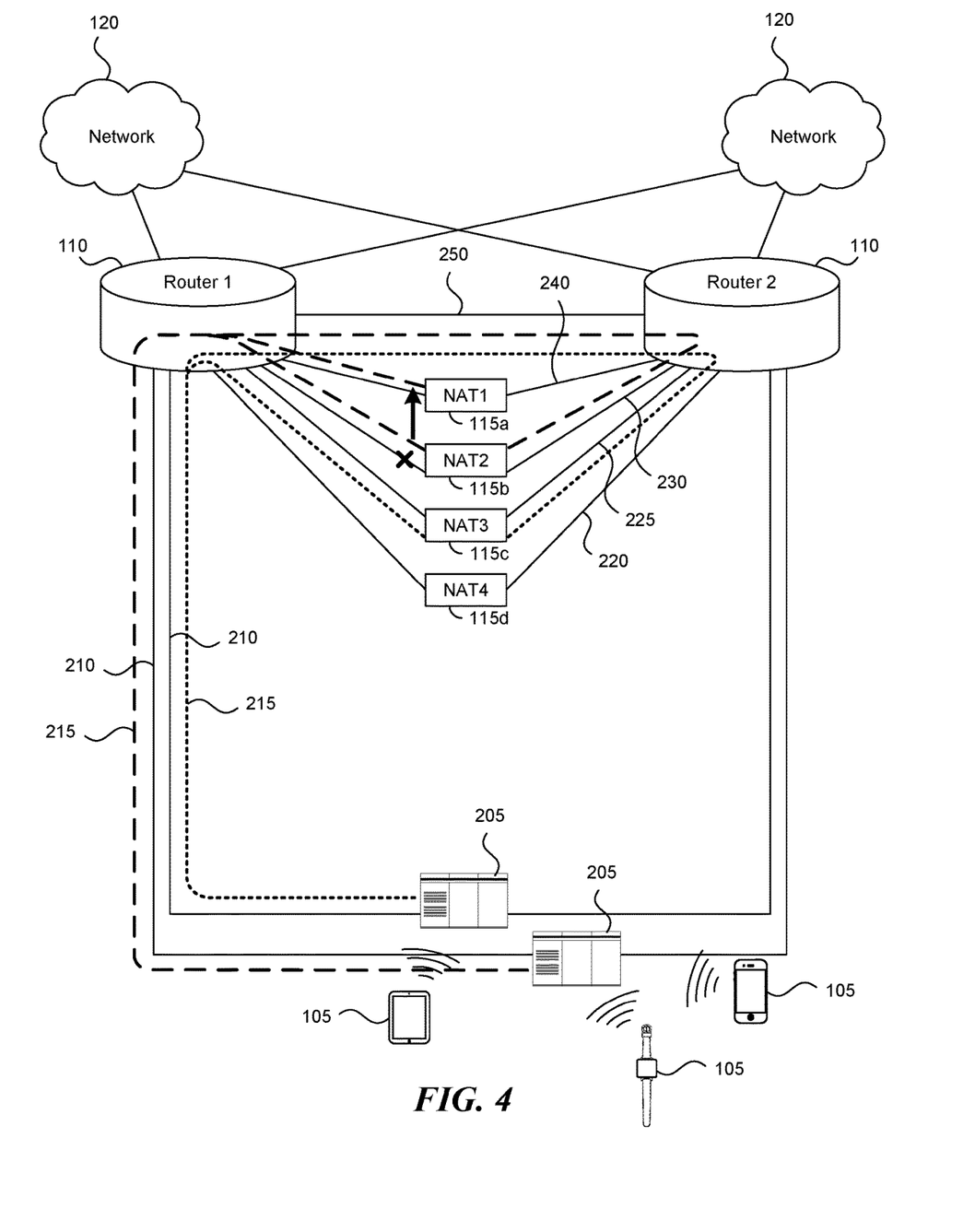
FIG. 4 is a block diagram illustrating various components used to route communications in response to a link failure or error that has occurred in accordance with embodiments of the disclosed technology.
Figure 5:
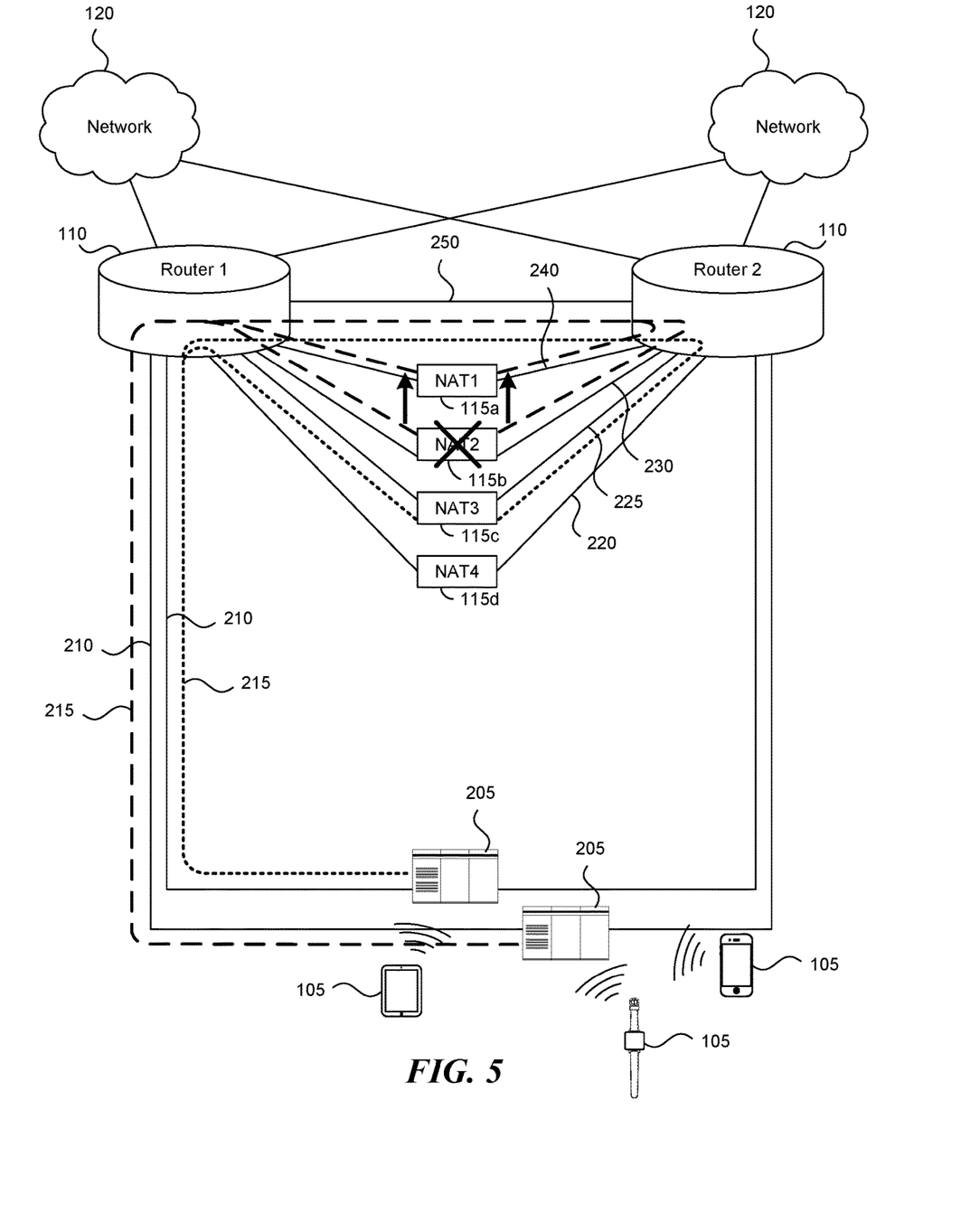
FIG. 5 is a block diagram illustrating various components used to route communications where a network address translation (NAT) device failure or error has occurred in accordance with embodiments of the disclosed technology.
Figure 6:
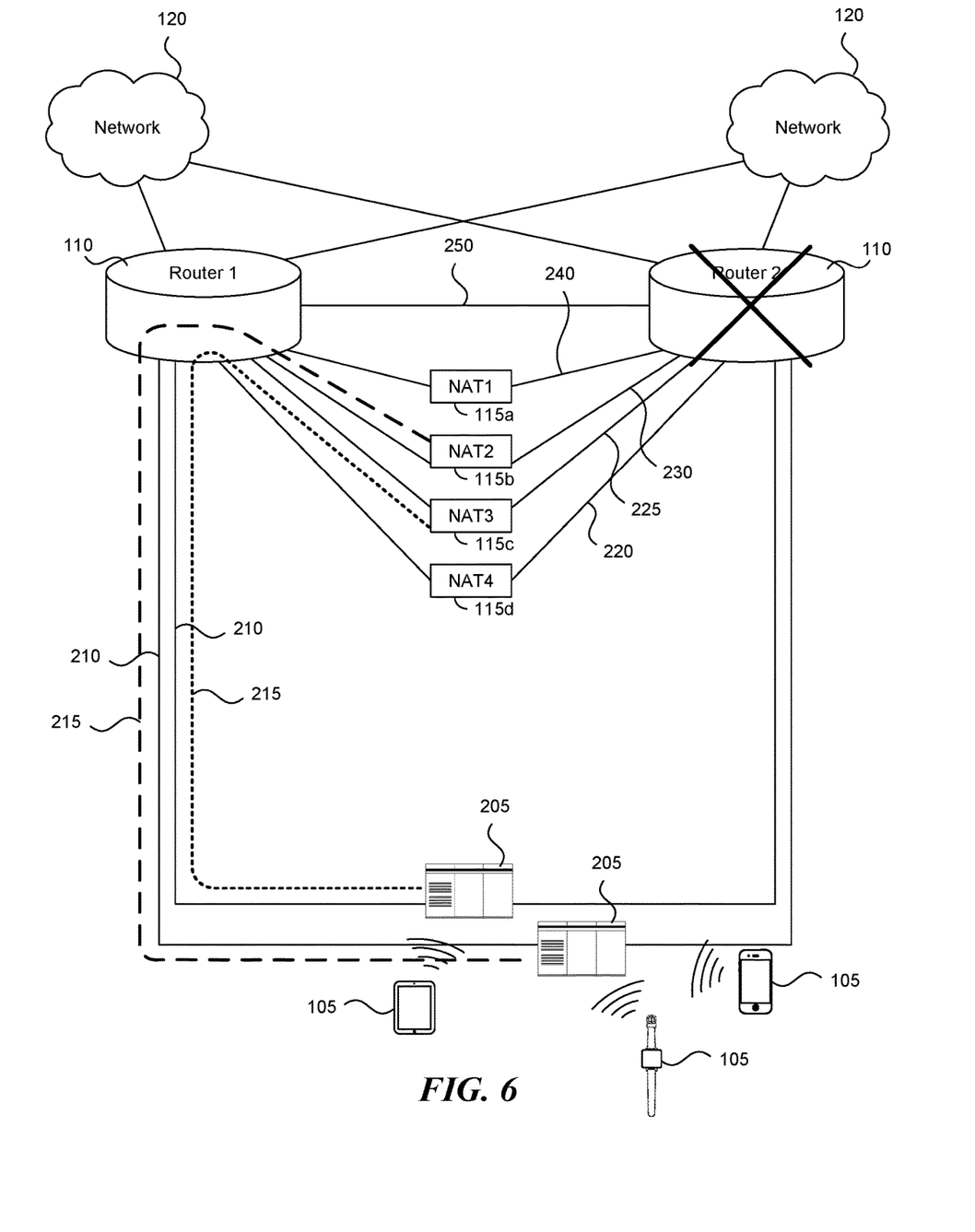
FIG. 6 is a block diagram illustrating various components used to route communications in response to a router failure or error in accordance with embodiments of the disclosed technology.

At determination operation 306, the router determines that communication with one or more of the multiple NAT devices has failed. A communication failure can happen for several reasons, which include a link failure as described in more detail in FIG. 4; NAT device failure as described in more detail in FIG. 5; router failure as described in FIG. 6; and failure to receive a packet for a predetermined time period. Overall, failure can also be referred to as a network condition, meaning a condition of the network that is affecting communication with a device. FIGS. 4-6 illustrate a variety of network conditions, and are described in further detail below.

At determination operation 306, a router can determine that a failure has occurred based on a routing algorithm. For example, the router and NAT devices in a network can use BFD to determine status and availability. The disclosed technology can use other routing protocols defined by the IETF in determining the status of NAT devices. As an alternative to using a routing protocol or standard, a network administrator can design a custom routing protocol based on network specifications. In some embodiments, the custom protocol can be based on timing. For example, if the router determines that a NAT device has failed to send three packets in the last 100 ms, the router can determine the NAT device has failed.

During routing operation 308, the router routes based on the determined status of each NAT device. If all NAT devices are active, the router can continue to route traffic to each NAT device accordingly to router policy. If one or more NAT devices has failed, the router can route traffic to the backup NAT device. After routing operation 308, process 300 can end. As an alternative to ending, process 300 can be repeated multiple times by a router that is directing traffic in a network.

Some examples of routing traffic to NAT devices and a backup NAT device are shown below in Tables 2 and 3. Tables 2 and 3 have three columns. The first column contains identifying information for NAT devices in communication with a router; the second column contains status information for the NAT devices, which is based on receiving or not receiving advertising packets from NAT device; and the third column contains router policy information in the event of a network condition (e.g., NAT device failure or link failure). Table 2 shows an embodiment where one NAT device, NAT2, has a failed status. Table 3 shows an embodiment where two NAT devices, NAT1 and NAT2, have a failed status.

TABLE 2

| NAT Device | Status | Router Policy |
|---|---|---|
| NAT1 | Active | Continue routing traffic to NAT1 unless NAT1 status is failed. If NAT1 status is failed, route traffic to NAT4. |
| NAT2 | Failed | Route traffic to backup NAT4 until advertising packets are received from NAT2. |
| NAT3 | Active | Continue routing traffic to NAT3 unless NAT3 status is failed. If status is failed, route traffic to NAT4. |
| NAT4 (backup) | Active | If NAT1 status is failed, route traffic for NAT1 to NAT4. If NAT2 status is failed, route traffic for NAT2 to NAT4. If NAT3 status is failed, route traffic for NAT3 to NAT4. |

TABLE 3

| NAT Device | Status | Router Policy |
|---|---|---|
| NAT1 | Failed | Route traffic to backup NAT4 until advertising packets are received from NAT1. |
| NAT2 | Failed | Route traffic to backup NAT4 until advertising packets are received from NAT2. |
| NAT3 | Active | Continue routing traffic to NAT3 unless NAT3 status is failed. If status is failed, route traffic to NAT4. |
| NAT4 (backup) | Active | If NAT1 status is failed, route traffic for NAT1 to NAT4. If NAT2 status is failed, route traffic for NAT2 to NAT4. If NAT3 status is failed, route traffic for NAT3 to NAT4. |

Although one backup NAT device can be used to back up multiple NAT devices in the process 300, the disclosed technology can also have multiple backup NAT devices backing up multiple NAT devices. A router can receive advertising packets from the multiple NAT devices and the multiple backup NAT devices. For example, a network can have five NAT devices and two backup NAT devices, or ten NAT devices and three backup NAT devices. The number of backup NAT devices can depend on network traffic and the goals of the organization hosting the network. For example, a company providing telecommunications services may prefer to have a high number of backup devices because the risk of failure is high and failures cause the loss of customers. Alternatively, a ISP may provide standard internet service and prefer to have less backup devices to limit cost.

FIG. 4 is a block diagram illustrating a link failure. As shown by the "x" mark on FIG. 4, link 230 that connects the router 110 (Router 1) to the NAT device 115b (NAT2) has failed. Also, as shown by the bold upward arrow, the Router 1 is now sending packets for translation to NAT1 instead of NAT2. Some example link failures are when the connecting medium (e.g., wire) is physically damaged (e.g., severed) or the interface between the device and link malfunctions. As a result of a link failure, communication between Router 1 and NAT2 is limited or not possible. Because of the failure, devices update their routing tables. For example, NAT2 can now stop forwarding or sending packets to Router 1 and instead send packets to the second router 110, Router 2. Although FIG. 4 shows Router 1 directing traffic to NAT1 instead of NAT2, Router 1 can instead direct traffic to NAT device 115c (NAT3) and/or NAT device 115d (NAT4) depending on router policy.

FIG. 5 is a block diagram illustrating a NAT device failure. As shown by the "x" mark on FIG. 5, NAT device 115b (NAT2) has failed. As a result of this failure, the routers 110 (e.g., Router 1 and Router 2) have updated the routing tables to reflect a failed status of NAT2. Also, as indicated by the bold upward arrows in FIG. 5, the routers 110 have routed traffic (e.g., changed the packet headers to indicate delivery to a different location) to NAT device 115a (NAT1) instead of NAT2. Although FIG. 5 shows traffic being directed to NAT1, the routers 110 could additionally or alternatively direct traffic to NAT device 115c (NAT3) or 115d (NAT4). The decision to route traffic to another available NAT device can be based on router policy. Router policy can be based on quality of service, cost saving, load sharing and balancing, and/or capacity of the available NAT devices.

FIG. 6 is a block diagram illustrating a router failure or error. Router failure can occur for several reasons. Some examples include device failure, overloading, a failure of communication with the router (e.g., limited connectivity or delay in response), packet loss, and/or a related router issue such as a software malfunction. As shown in FIG. 6, gateways 205, NAT devices 115a-115d, router 1, and networks 120 can route traffic to Router 2. As a result of router failure, each device will update its routing table to take another path (e.g., the cost of routing a packet to Router 2 will be set to infinity).

Figure 7:
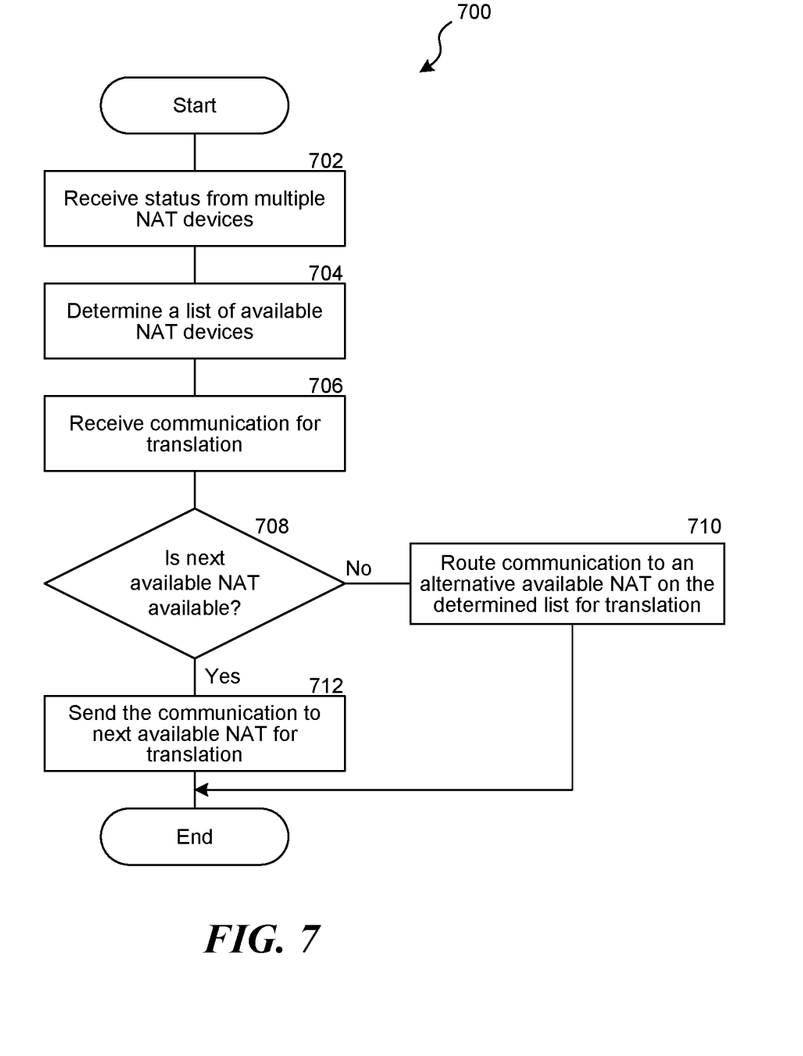
FIG. 7 is a flowchart illustrating a process for routing communications in accordance with embodiments of the disclosed technology.

FIG. 7 is a flowchart illustrating a process 700 for routing communications. Unlike process 300 that includes a backup NAT device, process 700 avoids using a backup NAT device. Instead, process 700 includes executing a round-robin algorithm where the next available NAT device (also referred to as "alternate NAT device") is used for IP address translation. Process 700 begins at receiving operation 702. At receiving operation 702, the router receives status from multiple NAT devices similar to receiving operation 302 described in FIG. 3. At determining operation 704, the router determines a list of available NAT devices similar to determination operation 304 described FIG. 3. An available NAT device is a NAT device that provides the router with status information that meets router policy. For example, a router may have a policy that it needs to receive an advertising packet from a NAT device every second, and if it does not receive an advertising packet for three seconds, it will assume the NAT device is not active. As shown in Table 4 below, the router has received advertising packets from all four NAT devices indicating that the NAT devices are available. Note, in Table 4, NAT4 is not a backup NAT device as described in FIG. 3 and Tables 1 and 2 because process 700 avoids backup NAT devices and instead uses a round-robin algorithm.

TABLE 4

| NAT Device | Status | Router Policy for Determining Status | Available for Round Robin |
|---|---|---|---|
| NAT1 | Active | Received advertising packet within predetermined time interval | Yes |
| NAT2 | Active | Received advertising packet within predetermined time interval | Yes |
| NAT3 | Active | Received advertising packet within predetermined time interval | Yes |
| NAT4 | Active | Received advertising packet within predetermined time interval | Yes |

Sometime later, one of the NAT devices failed. Table 5 below shows that a router has failed to receive an advertising packet from NAT3, has received an advertising packet from NAT3 indicating it has failed, or NAT3 is otherwise experiencing an error. As a result of determining that NAT3 has a failed status, NAT3 is removed from the available NAT list and the router routes traffic to the next available NAT device. For example, the router can send packets to NAT4 instead of NAT3 because NAT4 is the next available NAT. Alternatively, the router can send packets to NAT1 or NAT2 instead of NAT3.

TABLE 5

| NAT Device | Status | Router Policy | Available for Round Robin |
|---|---|---|---|
| NAT1 | Active | If received advertising packet within predetermined time interval, route NAT requests to NAT1 using round robin algorithm | Yes |
| NAT2 | Active | If received advertising packet within predetermined time interval, route NAT requests to NAT2 using round robin algorithm | Yes |
| NAT3 | Failed | If failed to receive advertising packet within predetermined time interval, re-route NAT requests to next available NAT using round robin algorithm | No |
| NAT4 | Active | If received advertising packet within predetermined time interval, route NAT requests to NAT4 using round robin algorithm | Yes |

Some more time later, another one of the NAT devices failed and the failed NAT (NAT3) has been fixed. As a result determining that another NAT device (NAT4) has a failed status, NAT4 is removed from the available NAT list and the router routes traffic to the next available NAT device. Table 6 below shows the updated status of each NAT device.

TABLE 6

| NAT Device | Status | Router Policy | Available for Round Robin |
|---|---|---|---|
| NAT1 | Active | If received advertising packet within predetermined time interval, route NAT requests to NAT1 using round robin algorithm | Yes |

TABLE 6-continued

| NAT Device | Status | Router Policy | Available for Round Robin |
|---|---|---|---|
| NAT2 | Active | If received advertising packet within predetermined time interval, route NAT requests to NAT2 using round robin algorithm | Yes |
| NAT3 | Active | If received advertising packet within predetermined time interval, route NAT requests to NAT3 using round robin algorithm | Yes |
| NAT4 | Failed | If failed to receive advertising packet within predetermined time interval, re-route NAT requests to next available NAT using round robin algorithm | No |

At receiving operation 706, the router receives communication for translation. The router reads the header information of the communication to determine the destination and source of the packet (e.g., reading the header of the packet or packets). Based on the analysis, the router can determine that a packet is destined for the Internet and came from a source with a private IP address. Because the communication needs a public IP address to be sent on the Internet, the router sends the communication to a NAT device for translation from a private IP address to a public IP address (e.g., by changing the header information of the packet).

At decision operation 708, the router determines whether the next available NAT device on the list is available. If the router determines that the next available NAT device is not available, the router proceeds to alternate routing operation 710. The alternate routing option 710 includes a router selecting an alternate available NAT device on the available NAT device list to handle the NAT. The router can select an alternate NAT device by using a random selection algorithm of available NAT devices or an iterative selection process of available NAT devices from the list (e.g., NAT1 first, NAT2 second, where a NAT device is skipped if it is unavailable and the next NAT on the list is the alternate NAT device). If the router determines that the next available NAT device is available, the router proceeds to sending operation 712, and the router sends the communication to that available NAT device for translation.

In some embodiments, the router can select a NAT device for the sending operation 712. The router can base the selection on a random selection algorithm of available NAT devices, an iterative selection process of available NAT devices (e.g., NAT1 first, NAT2 second, where a NAT is skipped if it is unavailable), feedback from the available NAT devices (e.g., available capacity, latency), router policy, or any combination thereof. After sending operation 712, process 700 can end. As an alternative to ending, process 700 can be repeated multiple times by a router that is directing traffic in a network.

Other operations not shown in FIGS. 3 and 7 can be added to processes 300 and 700. In some embodiments, load balancing based on utilization information is added to process 700. Utilization information can include a utilization percentage that ranges from zero to 100, where zero indicates the NAT device is not actively translating any packets (it is "empty") and 100 indicates the NAT device is actively translating a maximum number of data packets (e.g., 100% full or at maximum utilization percentage). The utilization information can be used by a router to load balance translation duties across a cluster of NAT devices. For example, the router can send translation requests to a NAT device with the most availability for translation (e.g., zero current translation) before sending translation requests to NAT devices with the least availability for translation (e.g., operating at 95% utilization). As shown in Table 7 below, a router would first send translation requests to NAT2 because it is operating at 10% utilization as compared to NAT3, which is at 80% utilization. In some embodiments, backup NAT devices avoid advertising utilization information based on network administrator policy (e.g., backup NAT devices are presumed to always be available for translation, and advertising this status would be a waste of processing power and cause unwanted network traffic).

TABLE 7

| Device | Status | Router Policy | Utilization Percentage |
|---|---|---|---|
| NAT1 | Active | Determine NAT1 capacity based on protocol, route traffic to backup NAT if failure status detected for NAT1 | 90 |
| NAT2 | Active | Determine NAT2 capacity based on protocol, route traffic to backup NAT if failure status detected for NAT2 | 10 |
| NAT3 | Active | Determine NAT3 capacity based on protocol, route traffic to backup NAT if failure status detected for NAT3 | 80 |
| NAT4 (backup) | Active | If NAT1 status is failed, route traffic for NAT1 to NAT4. If NAT2 status is failed, route traffic for NAT2 to NAT4. If NAT3 status is failed, route traffic for NAT3 to NAT4. | n/a |

In some embodiments, routers and NAT devices can use SNMP to collect utilization information. For example, an external system (e.g., server) can receive utilization information from multiple NAT devices and routers that use the SNMP, and then use this utilization information to balance the load of NAT across multiple NAT devices. The external system can also communicate with the routers in the network in order to instruct the routers how to balance the load. The external system or device includes load balancing hardware such as a computer with load balancing software. Also, the external system automatically balances the load for a network based periodically by sending instructions to routers for load balancing. In some embodiments, the NAT devices or routers can have an internal system that tracks utilization based on the SNMP, and the internal systems can be used for load balancing. Internal systems can include custom software or applications to enable load balancing.

Further, processes 300 and 700 can include forecasting. Forecasting includes monitoring and storing NAT traffic information. NAT traffic information is information that relates to NAT duties such as number of translation requests, time of translation request, average number of translation requests per day or hour, threshold information, or other like information (e.g., above 90% utilization means the NAT device is operating at or near maximum capacity). A NAT device, router, or computer can collect NAT traffic information. Based on the NAT traffic information, a network administrator can determine when to add another NAT device, when a NAT device is underutilized, or predict NAT duties in a network. As an example use of forecasting, a router can determine that a particular NAT has been historically underutilized based on NAT traffic information, and the router can re-route traffic from an over utilized NAT device (e.g., more than 90% utilization) to the underutilized NAT device.

In some embodiments, feedback information can be integrated into processes 300 and 700. Feedback information is information regarding the operation of a NAT device. Feedback information includes amount of power used per time period (e.g., day or hour) by a NAT device, highest and lowest utilization percentage during a time period for a NAT, number of lost packets, or other related operating information. A router can use the feedback information to improve (e.g., optimize) NAT duties in a network. For example, based on feedback information, a router can determine that particular NAT device for a microcell in an office building downtown receives very few or no NAT requests on the weekend, but still consumes power to stay available. Based on the feedback information, a network administrator can instruct the router to send instructions to the particular NAT device to turn off on the weekends, and turn back on during the weekdays. During weekends when the particular NAT device is off, the router can route any NAT requests to another NAT device on another network or associated with another microcell.

The disclosed technology system may be of use in emerging 5G networks where numerous edge nodes are added to a network (e.g. femtocells, picocells, microcell, WiFi access points, etc.). Such edge nodes may have need to address translation closer to edges of a network, as opposed to deeper within networks. As a result, a router (or other network element, such as a NAT device itself) can determine that a particular NAT device covering a microcell at the edge of the network has been historically underutilized based on NAT traffic information. The router can then instruct or allow the underutilized NAT device to serve as a microcell gateway for the network, thereby having the underutilized NAT device to assume additional functionality within the network.

Alternatively, 4G/5G network operators may want to manage IP address translation from a centralized basis because it can improve IPv4 utilization depending on the type of devices and location of devices on a network. As a result, NAT devices can be placed closer to the core. Overall, the decision to place NAT devices at the edge or centralized position in network can be based on operator goals, service provider goals, cost, and efficiency, and nature of the network.

Also, each operation in the flow diagrams 3 and 7 may represent a module, segment, or portion of code that comprises one or more executable instructions for implementing the specified logical function(s). In some alternative implementations, the functions noted in the operations may occur out of the order noted in FIGS. 3 and 7. Also, each operation of the flow diagrams in FIGS. 3 and 7, and combinations of operations in the flow diagrams, can be implemented by special-purpose, hardware-based systems that perform the specified functions, or by combinations of special-purpose hardware and computer instructions. Additionally, in some alternative implementations, some functions may be omitted, skipped, or combined. Also, two operations shown in succession may, in fact, be executed substantially concurrently, or the operations may sometimes be executed in the reverse order, depending on the functionality involved. For example, the receiving operation 302 and status operation 304 can be combined into one operation and performed concurrently or at approximately the same time.

Additionally, the process 300 and the process 700 can be used separately or in combination. For example, a network administrator can have process 300 be the primary process when a network is operating safe mode, meaning that failure is more likely than normal and backup is a primary concern.

After a network stabilizes (e.g., the rate or occurrence of failures is reduced to seldom or rare), the network administrator can switch a router to operate using process 700.

Exemplary Computer System and Conclusion

Figure 8:
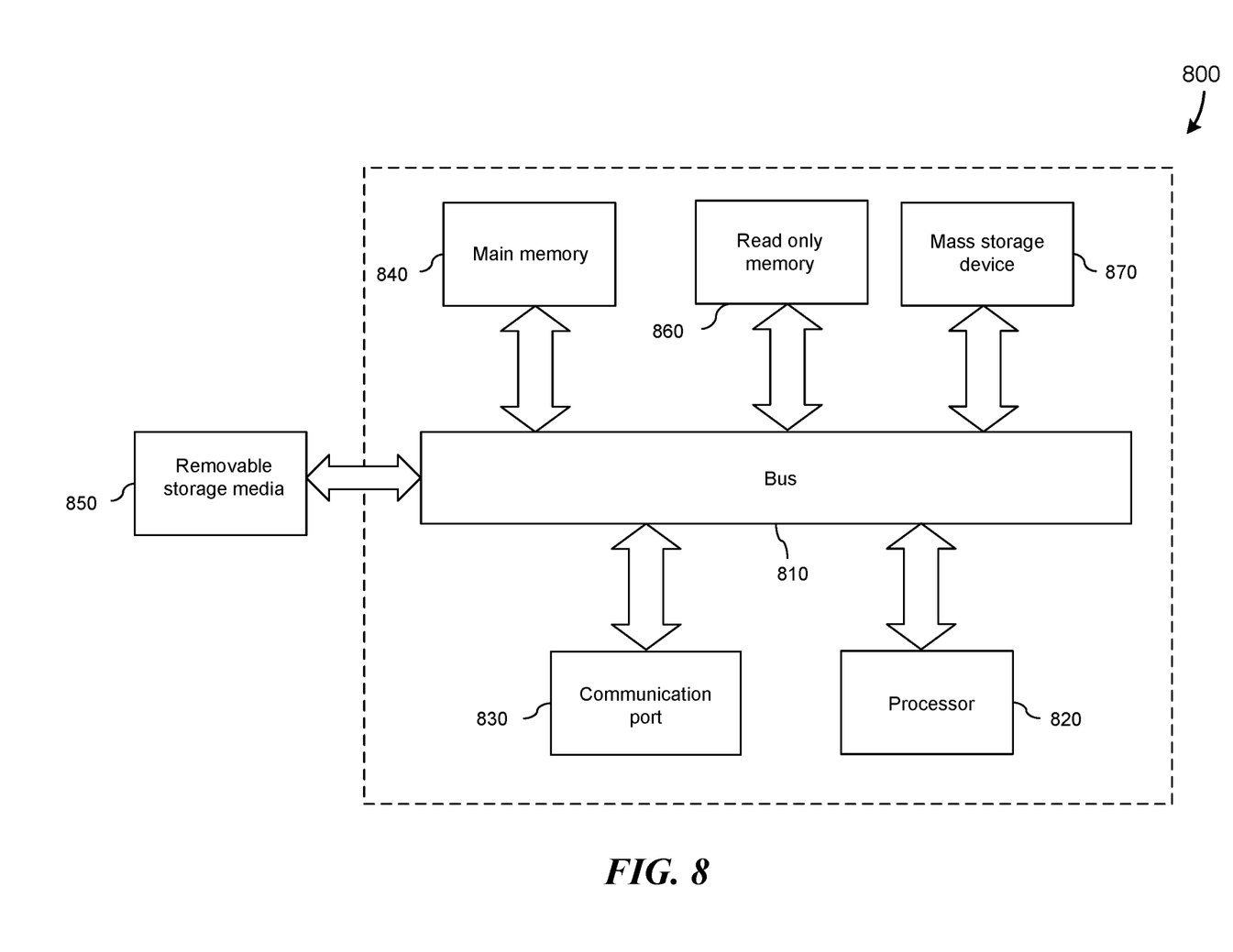
FIG. 8 illustrates a computer system in accordance with embodiments of the disclosed technology.

Embodiments of the disclosed technology include operations as described above. A variety of these operations can be performed by hardware components or can be embodied in machine-executable instructions, which can be used to cause a general-purpose or special-purpose processor programmed with the instructions to perform these operations. Alternatively, the operations may be performed by a combination of hardware, software, and/or firmware. For example, a NAT device, router, or other network component described in this disclosure can include hardware components to execute machine-executable instructions. As such, FIG. 8 illustrates a computer system in accordance with embodiments of the disclosed technology. According to the present example, the computer system includes a bus 810, processor 820, communication port 830, a main memory 840, a removable storage media 850, a read-only memory 860, and a mass storage device 870.

The processor(s) 820 can be any known processor, such as, but not limited to, ARM or x86-type processors, such as the Inter lines of processors; AMD™ lines of processors; or Motorola™ lines of processors. The communication port(s) 830 can be any of an RS-232 port for use with a modem-based dialup connection, a 10/100 Ethernet port, or a Gigabit port using copper or fiber. Communication port(s) 830 may be chosen, depending on a network such as a LAN, WAN, or any network to which the computer system 800 connects. The communication port 830 may also encompass wireless communications components, such as an IEEE 802.11, 3G/4G/5G, or other wireless transceiver.

The main memory 840 can be random access memory (RAM) or any other dynamic storage device(s) commonly known in the art. Read-only memory 860 can be any static storage device(s), such as programmable read-only memory (PROM) chips for storing static information such as instructions for processor 820.

The mass storage device 870 can be used to store information and instructions. For example, hard disks such as the Adaptec™ family of SCSI drives, an optical disc, an array of disks such as RAID, such as the Adaptec™ family of RAID drives, or any other mass storage devices 870 may be used.

The bus 810 communicatively couples processor(s) 820 with the other memory, storage, and communication blocks. The bus 810 can be a PCI/PCI-X- or SCSI-based system bus, depending on the storage devices used.

The removable storage media 850 can be any kind of external hard-drives, floppy drives, IOMEGA™ Zip drives, compact disc-read-only-memory (CD-ROM), compact disc-re-writable (CD-RW), and/or digital video disk-read-only memory (DVD-ROM).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the disclosed technology is not intended to be exhaustive or to limit the invention to the precise form disclosed above. While specific examples for the disclosed technology are described above for illustrative purposes, various equivalent modifications are possible within the scope of the disclosed technology, as those skilled in the relevant art will recognize.

The teachings of the disclosed technology provided herein can be applied to other systems, not necessarily the system described above. The elements and acts of the various examples described above can be combined to provide further implementations of the invention. Some alternative implementations of the disclosed technology may include not only additional elements to those implementations noted above, but also may include fewer elements.

Any patents and applications and other references noted above, including any that may be listed in accompanying filing papers, are incorporated herein by reference. Aspects of the disclosed technology can be modified, if necessary, to employ the systems, functions, and concepts of the various references described above to provide yet further implementations of the disclosed technology. When statements or subject matter in an incorporated by reference conflict with statements or subject matter of this application, then this application shall control.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the disclosed technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the invention to the specific examples disclosed in the specification, unless the above Detailed Description section explicitly defines such terms. Accordingly, the actual scope of the disclosed technology encompasses not only the disclosed examples, but also all equivalent ways of practicing or implementing the invention under the claims.

To reduce the number of claims, certain aspects of the disclosed technology are presented below in certain claim forms, but the applicant contemplates the various aspects of the disclosed technology in any number of claim forms. For example, while only one aspect of the disclosed technology is recited as a means-plus-function claim under 35 U.S.C. sec. 112, sixth paragraph 112(f) (AIA), other aspects may likewise be embodied as a means-plus-function claim, or in other forms, such as being embodied in a computer-readable medium. (Any claims intended to be treated under 35 U.S.C. § 112, ¶6(f) will begin with the words "means for", but use of the term "for" in any other context is not intended to invoke treatment under 35 U.S.C. § 112, ¶6(f).) Accordingly, the applicant reserves the right to pursue additional claims after filing this application to pursue such additional claim forms, in either this application or in a continuing application.

I claim:

1. A system comprising:
a first network address translation (NAT) device configured to send first advertising packets,
wherein the first advertising packets indicate a status of the first NAT device;
a second NAT device configured to send second advertising packets,
wherein the second advertising packets indicate a status of the second NAT device;
a first backup NAT device configured to send backup advertising packets,
wherein the backup advertising packets indicate a status of the first backup NAT device, and
wherein the first NAT device, the second NAT device, and the first backup NAT device are part of a number of devices configured to send advertising packets, the number of devices varying based on network traffic, network type, a capacity of each NAT device, and predicted loads on each NAT device; and
at least one router configured to route network traffic to the first NAT device, second NAT device, and first backup NAT device for address translation,
wherein the router is further configured to receive the first, second and backup advertising packets from the first, second, and first backup NAT devices, respectively, and
wherein the router is further configured to re-route network traffic from the first or second NAT devices to the first backup NAT device based on:
a determination that first or second advertising packets have not been received for a predetermined time period, or
receiving a message indicating an error with respect to the first or second NAT device.

2. The system of claim 1, wherein the router comprises:
a processor;
a memory storing instructions that, when executed by the processor, cause the router to perform a set of operations, where the operations comprise:
routing communications to the first NAT device, second NAT device, or backup NAT device using Border Gateway Protocol (BGP) or Open Shortest Path First (OSPF); and
implementing a Bidirectional Forwarding Detection (BFD) networking protocol with the first, second, and backup NAT devices.

3. The system of claim 1, wherein each of the first and second NAT devices are configured to send utilization percentages to the router, and wherein the router is configured to send communications for translation to the first or second NAT device with a lower utilization percentage before sending communications to the first or second NAT device with a higher utilization percentage.

4. The system of claim 1, further comprising:
a fourth NAT device configured to send fourth advertising packets to the router, wherein the fourth advertising packets indicate a status of the fourth NAT device;
a second backup NAT device configured to send second backup advertising packets to the router, wherein the second backup advertising packets indicate a status of the second backup NAT device.

5. The system of claim 1, wherein the first and second NAT devices are produced by different vendors and employ different communication protocols.

6. The system of claim 1, wherein the message relates to at least one of the following: a link failure, NAT device failure, router failure, or any combination thereof.

7. A computer-readable medium, excluding transitory, propagating signals, and storing instructions that, when executed by one or more processors, causes the one or more processors to:
receive a first message from a first set of network address translation (NAT) devices,
wherein the first message includes status information for one NAT device in the first set of NAT devices, and
wherein the first set of NAT devices includes N NAT devices and where N is greater than 1;
receive a second message from the first set of NAT devices, wherein the second message includes status information for another NAT device in the first set of NAT devices;
receive a third message from a second set of NAT devices,
wherein the third message includes status information for a NAT device in the second set of NAT devices,
wherein the second set of NAT devices includes M number of NAT devices,
wherein N is greater than M, and
wherein the N number of NAT devices and M number of NAT devices varies based on network traffic, network type, a capacity of each NAT device, and predicted loads on each NAT device; and,
in response to failing to receive another message from the first set of NAT devices for a time period at least partially determined by a router policy,
route communications for translation to the second set of NAT devices.

8. The computer-readable medium of claim 7, further comprising monitoring utilization of NAT devices by measuring a NAT device output level compared to a NAT device capacity, and based on the monitored utilization, adjusting a load of NAT across the first or second set of NAT devices via an application locally running on a router or NAT devices.

9. The computer-readable medium of claim 7, further comprising providing, to an external system, utilization information received from NAT devices and multiple routers coupled to the NAT devices, wherein the external system balances network address translation loads across routers and NAT devices based on the utilization information, and wherein the external system rebalances NAT loads based network requirements, business requirements, or computer computation availability.

10. The computer-readable medium of claim 7, wherein the time period is based on a router policy for quality of service in a telecommunications network.

11. The computer-readable medium of claim 7, wherein the instructions, when executed by the one or more processors, further cause the one or more processors to:
establish a communication path with the first and second sets of NAT devices based at least in part on a Bidirectional Forwarding Detection (BFD) networking protocol.

12. The computer-readable medium of claim 7, wherein the instructions, when executed by the one or more processors, further cause the one or more processors to:
receive utilization information for the first and second sets of NAT devices based on a simple network management protocol (SNMP); and in response to receiving the utilization information of the first and second sets of NAT devices, route traffic to the first and second sets of NAT devices to balance IP address translation loads across all NAT devices.

13. At least one computer-readable medium, excluding transitory, propagating signals, and storing instructions that, when executed by at least one processor, performs a method of using NAT devices, the method comprising:
receiving a first message from a first NAT device, wherein the first message includes status information for the first NAT device;
receiving a second message from a second NAT device, wherein the second message includes status information for the second NAT device;
receiving a third message from a third NAT device, wherein the third message includes status information for the third NAT device;
maintaining a list of available NAT devices based on the received first, second, and third messages;
receiving a first request to send a communication from a private internet protocol (IP) device or private network, to a public network;
determining that sending the communication to one of the available NAT devices is not to be performed because of a network condition,
wherein the network condition is at least partially based on a NAT device status or NAT device connectivity;
determining a next available NAT device from the maintained list of available NAT devices;
causing the communication to be sent to the next available NAT device;
receiving feedback information from the first, second, and third NAT devices for a first time period,
wherein the feedback information includes an indication of a number of NAT requests received by a NAT device during the first time period;
based on the feedback information, selecting the first, second, or third NAT device;
sending instructions to the selected NAT device to turn off during a next time period; and
during the next time period, routing traffic to non-selected NAT devices; and
after the next time period, sending instructions to the selected NAT device to turn on.

14. The computer-readable medium of claim 13, further comprising routing packets for translation to the first, second and third NAT devices using a round-robin algorithm to avoid use of a dedicated backup NAT device, whereby if the first NAT device becomes unavailable, the method routes packets to a next available NAT device.

15. The computer-readable medium of claim 13, further comprising distributing NAT duties across the first, second and third NAT devices to reduce translation load on individual NAT devices.

16. The computer-readable medium of claim 13, wherein the network condition is related to Voice over IP packet loss in a telecommunications network.

17. The computer-readable medium of claim 13, wherein the network condition includes a NAT device failure or malfunction, link failure or malfunction, or any combination thereof, and wherein the communication is based on an Internet Protocol version 4 (IPv4) suite and is intended to be sent to a device or network with an Internet Protocol version 6 (IPv6) suite or the communication is based on an IPv6 suite and is intended to be sent to a device or network with an IPv4 suite.

18. The computer-readable medium of claim 13, wherein the private network or the public network includes multiple microcells, and wherein the method further comprises:
determining that the first NAT device is underutilized; and,
instructing the first NAT device to perform microcell gateway functions.

\* \* \* \* \*